Patented Dec. 2, 1952

2,620,337

UNITED STATES PATENT OFFICE 2,620,337

ADDUCTS OF BISNORCHOLATRIENIC-22-ALDEHYDES

Robert H. Levin, Kalamazoo, Mich., assignor to The Upjohn Company, Kalamazoo, Mich., a corporation of Michigan No Drawing. Application August 18, 1949, Serial No. 111,100

6 Claims. (Cl. 260—239.55)

The present invention relates to certain adducts of steroid aldehydes, and is more particularly concerned with dienophilic adducts of certain bisnor-5,7,9-cholatrienic aldehydes and with a method for the preparation thereof.

The 1,4-addition of a class of compounds, known as "dienophiles," to a conjugated system of double bonds is well known in the art, being designated as the Diels-Alder reaction. The addition products of this reaction are known generally as "adducts." It is also known that the double bonds present in a conjugated diene may be protected from many chemical reactions by the formation of such an adduct. It is further known that, in a conjugated triene, only two of the double bonds may be protected by the formation of an adduct, the third double bond remaining unaffected.

The above-mentioned adducts, and derivatives formed using these adducts as starting intermediates, are of particular interest in the field of steroid research due to the biological activity of the cortical hormones and certain known derivatives thereof. The oxygenated derivatives of other steroids are known to have biological effects differing widely from the unoxygenated steroids, and it is, therefore, of importance to investigate the oxygenated derivatives of the aforesaid adducts, particularly those oxygenated at the point of unsaturation adjacent to the 11-carbon atom, as well as to investigate the biological activity of the adducts themselves, and their further degradation products.

It is an object of this invention to provide a method whereby only the 22:23 double bond but not the 9:11 double bond in a Diels-Alder adduct of dehydroergosterol or a 3-ester thereof may be ozonized. It is an additional object of this invention to provide a method whereby an adduct of dehydroergosterol or a 3-ester thereof may be converted to a C–22 aldehyde in excellent yield by the oxidative cleavage of the double bond between the side-chain carbon atoms 22 and 23 without oxidation of the unprotected nuclear double bond between carbon atoms 9 and 11.

The products of the present invention are useful as starting materials for the synthesis of the 22-enolesters of adducts of 3-acyloxybisnorcholatrienic-22-aldehydes and of steroid compounds having an oxygen atom or double bond attached to the "C" ring, such as corticosterone, 17-hydroxycorticosterone, 11-dehydro-17-hydroxycorticosterone, and the provision of such novel and useful products is a further object of the invention. Still other objects of the invention will become apparent hereinafter.

The adducts of the present invention may be represented by the general formula:

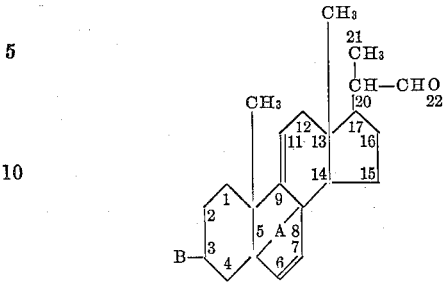

wherein B is a hydroxyl group or an esterified hydroxyl group and A is an adduct bridge between the two carbon atoms designated as carbon atoms 5 and 8, said adducts being derived from a dienophile of the group consisting of aliphatic 1,2-olefinic-1,2-dicarboxylic acids, their esters and anhydrides.

Novel compounds of the present invention which are of particular interest are compounds of the above general formula wherein B is hydroxy or an acyloxy group containing up to and including eight carbon atoms, i. e., an ester of the 3-hydroxyl group with a saturated mono- or dicarboxylic aliphatic acid, such as formic, acetic, chloroacetic, propionic, butyric, pentanoic, hexanoic, heptanoic, octanoic, cyclopentanoic, cyclohexanoic, benzoic, and succinic, or the like. The adduct bridge (—A—) in such compounds has the formula:

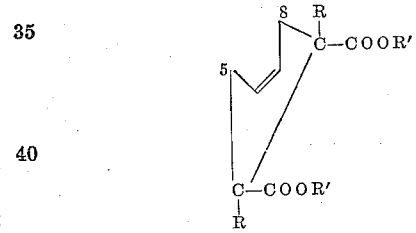

wherein R represents hydrogen or an alkyl radical containing up to and including four carbon atoms, such as methyl, ethyl, propyl, isopropyl, and butyl. Both radicals represented by R may represent the same alkyl radical, or they may represent different alkyl radicals. Moreover, one R may represent hydrogen and the other R chlorine, bromine, or an alkyl radical. In a preferred modification, both radicals designated R are hydrogen. R' in the formula for the adduct includes methyl, ethyl, propyl, butyl, isobutyl, hexyl, pentyl, octyl, cyclohexyl, cyclohexyl-methyl, benzyl, methylbenzyl, and others. While the esters of the maleic acid adduct of this invention are described herein with particular reference to the methyl esters, the preferred embodiment of R', where R' indicates an esterifying radical, is a lower-alkyl radical containing from one to eight carbon atoms, inclusive. R' may also represent hydrogen, or, alternatively, the formula for the adduct may be:

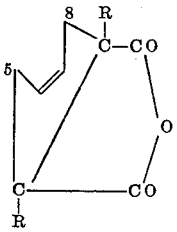

which is representative of the anhydride adduct, wherein R has the value previously assigned.

The compounds of this invention are colorless crystalline solids, insoluble in water, soluble in halogenated hydrocarbons, and moderately soluble in ether, ethyl acetate, and benzene. The acid anhydride adducts are readily converted to the free acid adducts by hydrolysis. These acid adducts in turn are readily converted to ester adducts by esterification with conventional reagents, for example, diazoalkanes, diazomethane, diazobutane, and the like. [J. Org. Chem. 13, 763 (1948).]

Such compounds are prepared, in accord with the process of this invention, by the selective oxidation of an adduct of an ester of dehydroergosterol, having the following general formula, in which A and B have the values previously assigned:

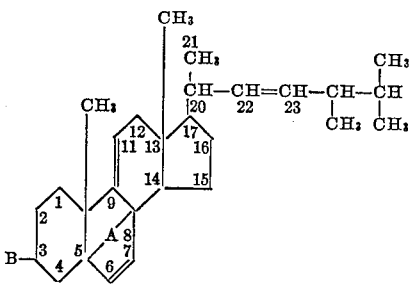

It has now been found that the aforementioned objects of the present invention may be accomplished, and adducts of dehydroergosterol, or 3-esters thereof, ozonized to the corresponding 22-aldehydes, by carrying out the reaction in solution, with a very small excess of ozone, at a temperature of from about minus 80 to about plus 30 degrees centigrade, and thereafter decomposing the ozonide under reductive conditions and isolating the product thus produced.

The 3-esters of dehydroergosterol, from which some of the starting adducts of this invention are prepared, may be synthesized by several routes starting with ergosterol. For example, ergosterol can be transformed to dehydroergosterol with mercuric acetate according to known methods [Ann. 465, 157 (1948)] and the 3-hydroxyl group of the dehydroergosterol acylated by known procedure. Alternatively, the 3-hydroxyl group of ergosterol may be acylated prior to the preparation of the dehydro derivative, a procedure which is particularly preferred in the preparation of the 3-acetoxy derivative. The starting adducts of this invention are then prepared by the addition of maleic anhydride or the like to dehydroergosterol or its 3-esters according to known methods. The anhydride can then be converted to the acid or its esters as is more fully described hereinafter.

The ester group, when present in the 3-position of the starting dehydroergosterol, is for the purpose of protecting the 3-hydroxyl group in the subsequent chemical reactions leading to the preparation of therapeutically active steroids containing oxygen in the "C" ring. For this purpose, any ester of an organic carboxylic acid not containing a substituent reactive to ozone under the ozonization conditions of this invention can be used. The esters of saturated aliphatic acids such as formic, acetic, propionic, butyric, chloroacetic, bromobutyric, methoxyacetic, isovaleric, hexanoic, heptanoic, or octanoic; the half esters of phthalic, succinic, or methylsuccinic acids; cycloaliphtic acids such as cyclohexanoic, methylcyclohexanoic; or aromatic acids such as benzoic, toluic, and naphthoic acids, and the like, are preferred. While protection of the hydroxyl group is not required during the method of the present invention, these esters can be prepared by reacting dehydroergosterol with the selected acid, acid chloride, or acid anhydride according to conventional procedure, or esterifying ergosterol and thereafter converting the ester to the dehydro derivative.

A preferred method for the preparation of some of the starting compounds of this invention comprises the saponification of the 3-acyloxy (e. g., 3-acetoxy) adduct of dehydroergosterol with aqueous or dilute alkali, e. g., sodium or potassium hydroxide solution, followed by acidification. The 3-hydroxy dicarboxylic acid adduct which is formed can then be recovered by dilution with water, filtration, and crystallization from methanol. The 3-hydroxy dicarboxylic acid adduct thus obtained can be converted to the 3-hydroxy anhydride adduct by heat, or it can be converted to any desired 3-acyloxy anhydride adduct by heating under reflux with the appropriate acid anhydride in pyridine solution. Esterification of the 3-hydroxy dicarboxylic acid adduct to form alkyl or other esters can be effected in several ways. Dialkyl esters can be readily formed by subjecting the acid to the action of a diazoalkane [J. Org. Chem. 13, 763 (1948)] such as diazomethane, diazoethane, diazobutane, and the like. The diester may then be crystallized from ether or other suitable solvent. Alkyl esters may also be formed by the use of other suitable esterifying agents such as dialkyl sulfates, a mixture of an alkanol and hydrogen chloride, phosphoric acid, or other mineral acid, or by the interaction of an alkali metal salt of the acid and an alkyl halide.

The dienophiles, which may be used to form adducts useful in the method of the present invention, are olefinic dibasic acids, their esters and anhydrides, which have a double bond located between two adjacent carboxyl groups, commonly referred to as 1,2-olefinic-1,2-dicarboxylic acids. Among the dienophiles which are suitable for use in the method of the invention are maleic acid, maleic anhydride, bromomaleic anhydride, dimethyl fumarate, dimethyl maleate, diethyl maleate, citraconic anhydride, mesaconic anhydride, and the like. The preferred dienophiles are maleic anhydride, maleic acid, its lower-alkyl esters and homologous anhydrides, acids, and lower-alkyl esters. The adducts of these dienophiles can be prepared by heating an ester of dehydroergosterol and the dienophile in benzene or xylene solution, the addition taking place more readily with dehydroergosterol and 3-esters thereof than with many other unsaturated sterols.

The starting adduct, then, has the formula:

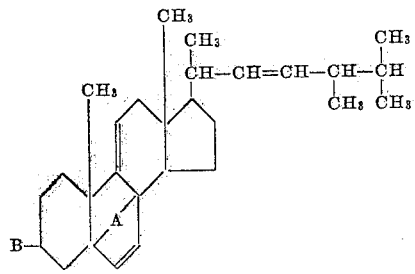

wherein B is a hydroxyl group or an acyloxy group, i. e., an ester of the 3-hydroxyl group with an acid such as formic, acetic, propionic, butyric, valeric, isovaleric, hexanoic, heptanoic, octanoic, chloroacetic, bromobutyric, or methoxyacetic; the half esters of glutaric, phthalic, succinic or methylsuccinic; cyclohexanoic, methylcyclohexanoic, benzoic, toluic, naphthoic, and the like, the said acid being in all cases free of ozonizable groups. Preferably the acid contains not more than ten carbon atoms, and lower-aliphatic acids containing from one to eight carbon atoms, inclusive, are especially suitable. Group A in the above formula is an adduct radical derived from a member of the group consisting of aliphatic 1,2-olefinic-1,2-dicarboxylic acids, esters, and anhydrides thereof, such as those adducts derived from maleic acid, maleic anhydride, bromomaleic anhydride, dimethyl fumarate, dimethyl maleate, diethyl maleate, citraconic anhydride, mesaconic anhydride, and the like, and especially such adducts as have the grouping:

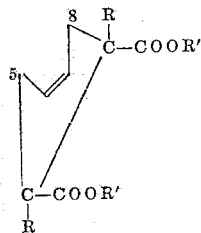

wherein R represents hydrogen or an alkyl radical containing up to and including four carbon atoms, such as methyl, ethyl, propyl, isopropyl, and butyl. Both radicals represented by R may represent the same alkyl radical, or they may represent different alkyl radicals. Moreover, one R may represent hydrogen and the other R an alkyl radical, or, in a preferred modification, both radicals designated R are hydrogen. R' in the formula for the adduct, includes methyl, ethyl, propyl, butyl, isobutyl, hexyl, heptyl, octyl, cyclohexyl, benzyl, and many others. The preferred embodiment, where R' indicates an esterifying radical, is a hydrocarbon radical, especially a lower-alkyl radical, containing from one to eight carbon items, inclusive. R' may also represent hydrogen, or, alternatively, the formula for the adduct (—A—) may be:

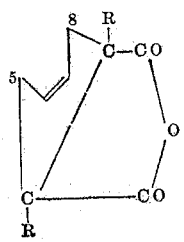

which is representative of the anhydride adduct, wherein R has the values previously given. In any case, the adduct radical (—A—) should also be free of ozonizable groups which would detract from the efficiency of the ozonization process.

The selective ozonization of the 22:23 double bond of such an adduct of dehydroergosterol or the 3-ester thereof without ozonization of the 9:11 double bond is accomplished by dissolving the adduct in a suitable solvent, cooling to about minus 80 to plus 30 degrees centigrade, and passing ozone into the solution until about 1.0 to 1.25, and preferably 1.0 to 1.05 moles of ozone, per mole or adduct, have been absorbed. The temperature of the solution should be maintained below plus 30 degrees centigrade, preferably between a temperature of minus 30 and minus 70 degrees centigrade, during the addition of ozone, although temperatures as low as minus 80 and as high as plus 30 degrees centigrade are operative. The lower temperatures of the preferred range are readily obtained by cooling the solution of the adduct with a bath of solid carbon dioxide in acetone, ethers of ethylene glycol, trichloroethane, or the like, although various other methods of cooling may be used. If the temperature is higher than plus 30 degrees centrigrade during any substantial period of the ozonization, the product is ordinarily contaminated with acids and other oxidation products. Many of the customary solvents used in ozonization of steroid molecules, such as chloroform, carbon tetrachloride, mixtures of ether and chloroform, glacial acetic acid, and the like, may be used, the preferred solvents being methylene chloride or methanol.

The quantity of ozone passed into the solution is of the utmost importance, the quantity being, for optimum results, no more than a five to 25 percent excess. If more than a 25 percent excess of ozone, over that required to oxidize the size-chain double bond to an aldehyde, is added, other unwanted oxidation products are obtained, especially in the higher temperature ranges.

A further critical consideration in the preparation of the aldehydes of this invention is that the decomposition of the ozonide be carried out under "reductive conditions," i. e., the absence of oxidizing agents, whether added, or formed in situ by products of the decomposition of the ozonide. This means that the excess oxygen formed by decomposition of the ozonide shall be prevented from forming hydrogen peroxide by combining with any moisture present and that the molecular oxygen must be prevented from oxidizing the aldehyde. This is conveniently accomplished by decomposing the ozonide in glacial acetic acid by the addition of zinc dust. The addition of a small quantity of alcoholic silver nitrate, from which molecular silver is formed during the decomposition, aids in the rapid decomposition of any hydrogen peroxide which may form. Other finely-divided metals, such as silver or magnesium, or non-oxidizing ozonide decomposing agents known in the art, may also be employed. See, for example, Hill and Kelly, "Organic Chemistry," page 63, The Blackiston Co., Philadelphia (1934); Gilman, "Organic Chemistry," page 636, 2nd ed., John Wiley and Sons, New York (1943); Church et al., J. Am. Chem. Soc. 56, 176–184 (1934); and Long, Chem. Reviews 27, 452–454 (1940). As is conventional with ozonizations, when conducted in solvents other than glacial acetic acid, the solvent used for the ozonization is replaced by glacial acetic acid after completion of the ozonization by adding glacial acetic acid to the ozonide solution and fractionally distilling, under reduced pressure, to remove the original solvent, with introduction of additional acetic acid if necessary.

After decomposition of the ozonide, as described above, and removal of the zinc, or other metal, the aldehyde can be recovered by diluting the acetic acid with water, and converting to conventional aldehyde derivatives such as the semicarbazone, hydrazone, phenylhydrazone, or 2,4-dinitrophenylhydrazone, if desired.

The following examples are illustrative of the process and products of the present invention, but are not to be construed as limiting.

PREPARATION 1.—DIMETHYL MALEATE ADDUCT OF DEHYDROERGOSTERYL BENZOATE

To a solution of 21 grams of the dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

PREPARATION 2.—DIMETHYL MALEATE ADDUCT OF DEHYDROERGOSTERYL ACETATE

In a manner essentially that described in Preparation 1, the dimethyl maleate adduct of dehydroergosteryl acetate, melting at 177 to 179 degrees centigrade, was prepared from the dimethyl maleate adduct of dehydroergosterol and acetyl chloride.

PREPARATION 3.—DIMETHYL MALEATE ADDUCT OF DEHYDROERGOSTERYL FORMATE

A solution of six grams of dimethyl maleate adduct of dehydroergosterol in fifty milliliters of 87 percent formic acid was heated under reflux for one hour, cooled, and the dimethyl maleate adduct of dehydroergosteryl formate filtered therefrom. Upon crystallization from acetone, the purified material melted at 177.5–178.5 degrees centigrade.

PREPARATION 4.—MALEIC ACID ADDUCT OF DEHYDROERGOSTEROL

Twelve grams of maleic anhydride adduct of dehydroergosteryl acetate was dispersed in 300 milliliters of methyl alcohol, whereafter a solution of 2.6 grams of potassium hydroxide in 300 milliliters of water was added to the suspension and the reaction mixture heated under reflux for 135 minutes, 200 milliliters of water being added portionwise during the reaction period. The hot solution was filtered to remove any undissolved solid, cooled, and acidified. After washing the precipitate with water and drying, there was obtained 9.2 grams of the maleic acid adduct of dehydroergosterol, melting at 119–129 degrees centigrade.

PREPARATION 5.—MALEIC ANHYDRIDE ADDUCT OF 3-HEPTOYLOXYDEHYDROERGOSTEROL

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3-heptoyloxydehydroergosterol, melting at 186–191.5 degrees centigrade.

Example 1.—Maleic anhydride adduct of 3-beta-acetoxybisnor-5,7,9-cholatriene-22-al and its 2,4-dinitrophenylhydrazone A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid were added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was thus obtained 4.31 grams of maleic anhydride adduct of 3-beta-acetoxybisnor-5,7,9-cholatriene-22-al, a fine white powder which melted at 187–197 degrees centigrade.

To a solution of 0.30 gram of the maleic anhydride adduct of 3-beta-acetoxybisnor-5,7,9-cholatriene-22-al in thirty milliliters of ethanol was added twenty milliliters of alcohol containing one percent 2,4-dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized, from a mixture of chloroform and alcohol, to give the 2,4-dinitrophenylhydrazone of the maleic anhydride adduct of 3-beta-acetoxybisnor-5,7,9-cholatriene-22-al, melting at 269–271 degrees centigrade.

Example 2.—Maleic anhydride adduct of 3-beta-acetoxybisnor-5,7,9-cholatriene-22-al A two-liter, round-bottom flask is charged with fifty grams (0.93 mole) of dehydroergosteryl acetate maleic anhydride adduct and one liter of methylene chloride. The solution is cooled to Dry-Ice temperature with a trichloroethylene bath and ozonized oxygen is passed through at a rate of 1200 milliliters of oxygen per minute (at this rate the ozonizer is producing about 36 milligrams of ozone per minute). The flow of ozonized oxygen is maintained for 128 minutes, a total of 4608 milligrams (105 percent) of ozone being passed into the solution. The reaction mixture is transferred to a two-liter, round-bottom flask fitted with a capillary and a condenser for downward distillation, 300 milliliters of acetic acid is added, and the methylene chloride is distilled in vacuo at forty degrees centigrade or below. The flask is then placed in a water bath and fitted with a stirrer. An additional 200 milliliters of acetic acid is added and the ozonide decomposed by the addition of fifty grams of zinc dust. The zinc dust is added in portions over a period of twenty to thirty minutes while the solution is stirred and the temperature maintained at seventeen to twenty degrees centigrade. After addition, the mixture is stirred for another twenty minutes and then filtered. The precipitated zinc dust is washed by filtering 100 milliliters of acetic acid therethrough, and the filtrate is gradually diluted with water (1100 to 1200 milliliters) until the product has been drowned out. The product is then cooled in the refrigerator overnight and filtered. The yield of crystalline product is 40 to 42 grams, assaying 89–95 percent of the desired aldehyde.

*Example 3*

In a manner essentially that described in Example 1, the following compounds were prepared.

1. Maleic anhydride adduct of 3-beta-formoxy-bisnor-5,7,9-cholatriene-22-al, melting at 95–130 degrees centigrade. 2,4-Dinitrophenylhydrazone, melting at 165–168 degrees centigrade.
2. Maleic anhydride adduct of 3-beta-heptoyloxy-bisnor-5,7,9-cholatriene-22-al, melting at 197.5–199 degrees centigrade. 2,4-Dinitrophenylhydrazone, melting at 253–257 degrees centigrade.
3. Dimethyl maleate adduct of 3-beta-benzoyl-oxybisnor-5,7,9-cholatriene-22-al, melting at 183–187 degrees centigrade. 2,4-Dinitrophenylhydrazone, melting at 224–249 degrees centigrade.
4. Dimethyl maleate adduct of 3-beta-acetoxy-bisnor-5,7,9-cholatriene-22-al, melting at 172–178 degrees centigrade. 2,4-Dinitrophenylhydrazone, melting at 238 to 244 degrees centigrade.
5. Dimethyl maleate adduct of 3-hydroxybisnor-5,7,9-cholatriene-22-al, melting at 163–170 degrees centigrade. 2,4-Dinitrophenylhydrazone, melting at 250–254 degrees centigrade.

In a manner similar to the above, the maleic anhydride adduct of 3-hydroxybisnor-5,7,9-cholatriene-22-al is obtained from dehydroergosteryl maleic anhydride adduct; the maleic acid adduct of 3-hydroxybisnor-5,7,9-cholatriene-22-al is obtained from dehydroergosteryl maleic acid adduct; and 3-acyloxybisnor-5,7,9-cholatriene-22-al maleic acid adducts are obtained from the maleic acid adduct of 3-acyloxydehydroergosterols.

*Example 4.—Dimethyl maleate adduct of 3-hydroxybisnor-5,7,9-cholatriene-22-al*

A solution of 2.69 grams (.005 mole) of the dimethyl ester of the maleic acid adduct of dehydroergosterol in eighty milliliters of methylene chloride, cooled by a Dry-Ice and trichloroethane bath, was treated with ozonized oxygen until 247.36 milligrams (.0051 mole) of ozone was absorbed. The solution was then allowed to warm to room temperature, whereafter thirty milliliters of acetic acid was added and the methylene chloride removed in vacuo. While cooling in a water-bath at fifteen degrees centigrade, four grams of zinc dust was added in portions with stirring, the temperature being maintained between fifteen and twenty degrees centigrade. Stirring was continued for another fifteen minutes, and the zinc then separated by filtration. The filtrate was diluted with water to cloudiness, extracted with ether, the ether extract washed with sodium bicarbonate, then with water to neutrality, and the solution then dried over sodium sulfate and evaporated to dryness in vacuo. The residue was crystallized from acetic acid and water, giving 1.92 grams (81.5 percent of theoretical), melting point 91–97 degrees centigrade, which yielded a dinitrophenylhydrazone derivative in 72.5 percent yield, melting point 212–238 degrees centigrade. The aldehyde was recrystallized and found to have a purified melting point of 163–170 degrees centigrade, while the dinitrophenylhydrazone derivative was recrystallized until a melting point of 250–254 degrees centigrade was attained.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of (*a*) bisnor-cholatrienic aldehyde derivatives represented by the general formula:

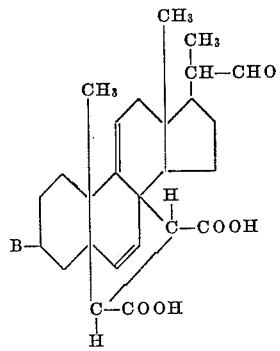

wherein B is selected from the group consisting of hydroxyl and an unsubstituted acyloxy group, AcO, wherein Ac is the residue of an organic monocarboxylic acid containing up to and including eleven carbon atoms; (*b*) anhydrides thereof; and (*c*) diesters thereof wherein the esterifying group is solely of a hydrocarbon nature and contains from one to eight carbon atoms, inclusive.

2. The maleic anhydride adduct of 3-acetoxy-bisnor-5,7,9-cholatriene-22-al.

3. The dimethyl maleate adduct of 3-hydroxy-bisnor-5,7,9-cholatriene-22-al.

4. The dimethyl maleate adduct of 3-acetoxy-bisnor-5,7,9-cholatriene-22-al.

5. The maleic anhydride adduct of 3-heptoyl-oxybisnor-5,7,9-cholatriene-22-al.

6. The dimethyl maleate adduct of 3-benzoyl-oxybisnor-5,7,9-cholatriene-22-al.

ROBERT H. LEVIN.

REFERENCES CITED

The following references are of record in the file of this patent:

UNITED STATES PATENTS

| Number | Name | Date |
|---|---|---|
| 2,296,284 | Julian | Sept. 22, 1942 |
| 2,321,690 | Logemann | June 15, 1943 |
| 2,398,709 | Hoehn et al. | Apr. 16, 1946 |
| 2,387,830 | Butz | Oct. 30, 1945 |
| 2,433,848 | Julian | Jan. 6, 1948 |

FOREIGN PATENTS

| Number | Country | Date |
|---|---|---|
| 522,870 | Great Britain | June 28, 1940 |

OTHER REFERENCES

Honigmann: Annalen der Chem., col. 508, p. 92 (1934) (complete article, pp. 92–104).

Heyl: Jour. Am. Chem. Soc. 69, 1957–1961 (1947).

Bergmann: Jour. Org. Chem. 13, 10–20 (1948).